(12) United States Patent
Tojo et al.

(10) Patent No.: US 8,619,523 B2
(45) Date of Patent: Dec. 31, 2013

(54) OPTICAL PICKUP AND OPTICAL READ/WRITE APPARATUS

(71) Applicant: Panasonic Corporation, Osaka (JP)

(72) Inventors: Tomoaki Tojo, Hyogo (JP); Yohichi Saitoh, Kyoto (JP); Kazuo Momoo, Osaka (JP)

(73) Assignee: Panasonic Corporation, Osaka (JP)

( * ) Notice: Subject to any disclaimer, the term of this patent is extended or adjusted under 35 U.S.C. 154(b) by 1 day.

(21) Appl. No.: 13/625,003

(22) Filed: Sep. 24, 2012

(65) Prior Publication Data

US 2013/0107692 A1    May 2, 2013

(30) Foreign Application Priority Data

Oct. 31, 2011  (JP) ................................. 2011-238367

(51) Int. Cl.
G11B 7/00    (2006.01)

(52) U.S. Cl.
USPC .................................... 369/44.38; 369/53.36

(58) Field of Classification Search
USPC ......... 369/44, 37, 44.38, 47.51, 53.35, 53.36, 369/116, 124.03
See application file for complete search history.

(56) References Cited

U.S. PATENT DOCUMENTS

| 4,853,917 | A | 8/1989 | Koyama et al. |
| 4,935,913 | A | 6/1990 | Shinoda |
| 5,283,775 | A * | 2/1994 | Finkelstein et al. ....... 369/53.37 |
| 6,088,310 | A * | 7/2000 | Yanagawa ................ 369/44.38 |
| 6,937,544 | B2 * | 8/2005 | Takehara et al. ........... 369/44.27 |

FOREIGN PATENT DOCUMENTS

| JP | 63-249941 A | 10/1988 |
| JP | 02-265036 A | 10/1990 |
| JP | 11-312312 A | 11/1999 |
| JP | 2005-038536 A | 2/2005 |

* cited by examiner

*Primary Examiner* — Brenda Bernardi
(74) *Attorney, Agent, or Firm* — Renner, Otto, Boisselle & Sklar, LLP

(57) ABSTRACT

An exemplary optical pickup comprises: first, second and third photosensitive elements which are arranged to respectively receive a main light beam and first and second sub-light beams reflected from an optical storage medium; and fourth and fifth photosensitive elements which are arranged to receive the rest of the light that has also been emitted from a light source but has not been reflected from the optical storage medium. A signal that has been written on the optical storage medium with the main light beam for writing is read by performing an arithmetic operation on the signal output of the second or third photosensitive element and that of the fourth photosensitive element.

10 Claims, 8 Drawing Sheets

BETWEEN TRACKS
(GROOVE)

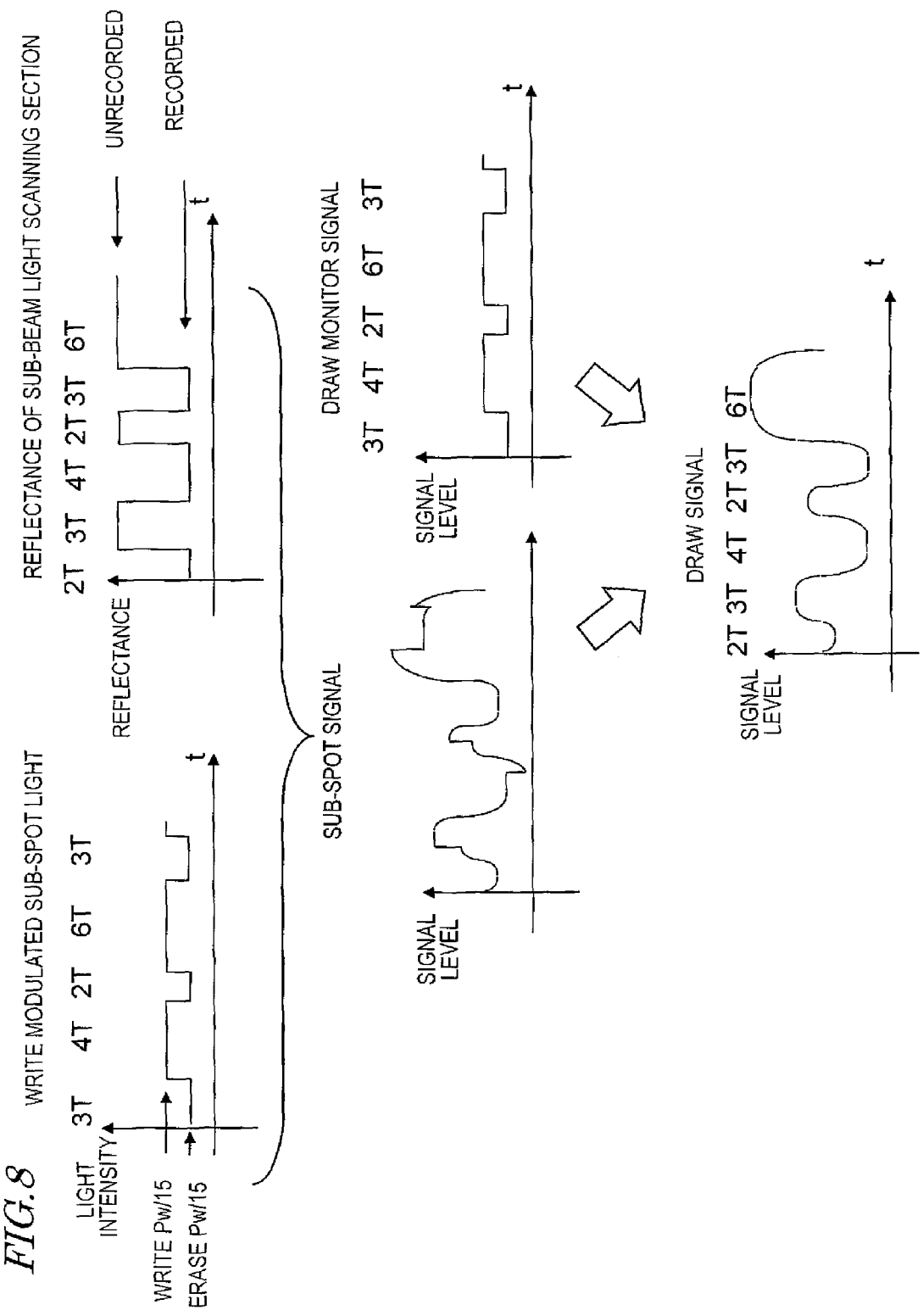

OPTICAL PICKUP AND OPTICAL READ/WRITE APPARATUS

BACKGROUND

1. Technical Field

The present disclosure relates to an optical pickup and an optical read/write apparatus comprising the optical pickup.

2. Description of the Related Art

A known read/write apparatus that reads and writes data from/on an optical storage medium such as a write-once or rewritable optical disc reads data that has been just written and compares the data that has been read to the data to write in order to detect an error, if any, lest the write operation should fail due to a defect on the storage medium. That is to say, by alternately writing data and checking the data just written time-sequentially over and over again, a verify operation gets done.

According to such a method, however, it is difficult to increase the write speed sufficiently. Also, even though this method is applicable effectively to an optical disc or any other medium with good random accessibility, it is hard to use such a method in a medium with poor random accessibility such as an optical tape with a great tape length, which does not allow the user to change the tape running direction or return to the same tape position easily.

Thus, to meet such a demand, a so-called "DRAW (direct read after write)" technique for performing a write operation and a read operation for verification purposes at the same time has been proposed in Japanese Laid-Open Patent Publications No. 63-249941 and No. 2005-038536.

SUMMARY

The prior art technique needs further improvement in view of providing a simple and cost-effective DRAW technique that can work fine even if some data is overwritten on a recorded storage medium.

One non-limiting and exemplary embodiment provides an optical pickup and optical read/write apparatus that can carry out the DRAW technique by as simple a method and at as low a cost as possible.

In one general aspect, an optical pickup disclosed herein comprises: a light source which emits light; an optical power modulator which modulates the optical power of the light source; an optical element which splits the light that has been emitted from the light source into a main light beam for writing and at least two sub-light beams including first and second sub-light beams; an optical system which condenses the main light beam and the first and second sub-light beams onto the same track on an optical storage medium, thereby forming a main spot and first and second sub-spots on the same track; first, second and third photosensitive elements which are arranged so as to respectively receive the main light beam and first and second sub-light beams that have been reflected from the optical storage medium; fourth and fifth photosensitive elements which are arranged so as to receive the rest of the light that has also been emitted from the light source but has not been reflected from the optical storage medium; and an arithmetic section which reads a signal that has been written on the optical storage medium with the main light beam for writing by performing an arithmetic operation on the signal output of the second or third photosensitive element and the signal output of the fourth photosensitive element.

The present disclosure also provides an optical read/write apparatus which includes an optical pickup, a motor which drives an optical storage medium, and a control section which controls the optical pickup. The optical pickup includes: a light source which emits light; an optical element which splits the light that has been emitted from the light source into a main light beam for writing and at least two sub-light beams including first and second sub-light beams; an optical system which condenses the main light beam and the first and second sub-light beams onto the same track on the optical storage medium, thereby forming a main spot and first and second sub-spots on the same track; first, second and third photosensitive elements which are arranged so as to respectively receive the main light beam and first and second sub-light beams that have been reflected from the optical storage medium; and fourth and fifth photosensitive elements which are arranged so as to receive the rest of the light that has also been emitted from the light source but has not been reflected from the optical storage medium. The control section includes: an optical power modulator which modulates the optical power of the light source; and an arithmetic section which reads a signal that has been written on the optical storage medium with the main light beam for writing by performing an arithmetic operation on the signal output of the second or third photosensitive element and the signal output of the fourth photosensitive element.

According to the above aspect, the DRAW technology can be carried out by a simple and cost effective method.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 8 is a signal waveform diagram illustrating the principle of performing a differential operation.

DETAILED DESCRIPTION

Hereinafter, embodiments will be described with reference to the accompanying drawings as needed. It should be noted that the description thereof will be sometimes omitted unless it is absolutely necessary to go into details. For example, description of a matter that is already well known in the related art will be sometimes omitted, so will be a redundant description of substantially the same configuration. This is done solely for the purpose of avoiding redundancies and making the following description of embodiments as easily understandable for those skilled in the art as possible.

It should be noted that the present inventors provide the accompanying drawings and the following description to help those skilled in the art understand the present disclosure fully. And it is not intended that the subject matter defined by the appended claims is limited by those drawings or the description.

Embodiment 1

Hereinafter, a first embodiment will be described with reference to the accompanying drawings.

1-1. Overall Configuration

Figure 1:
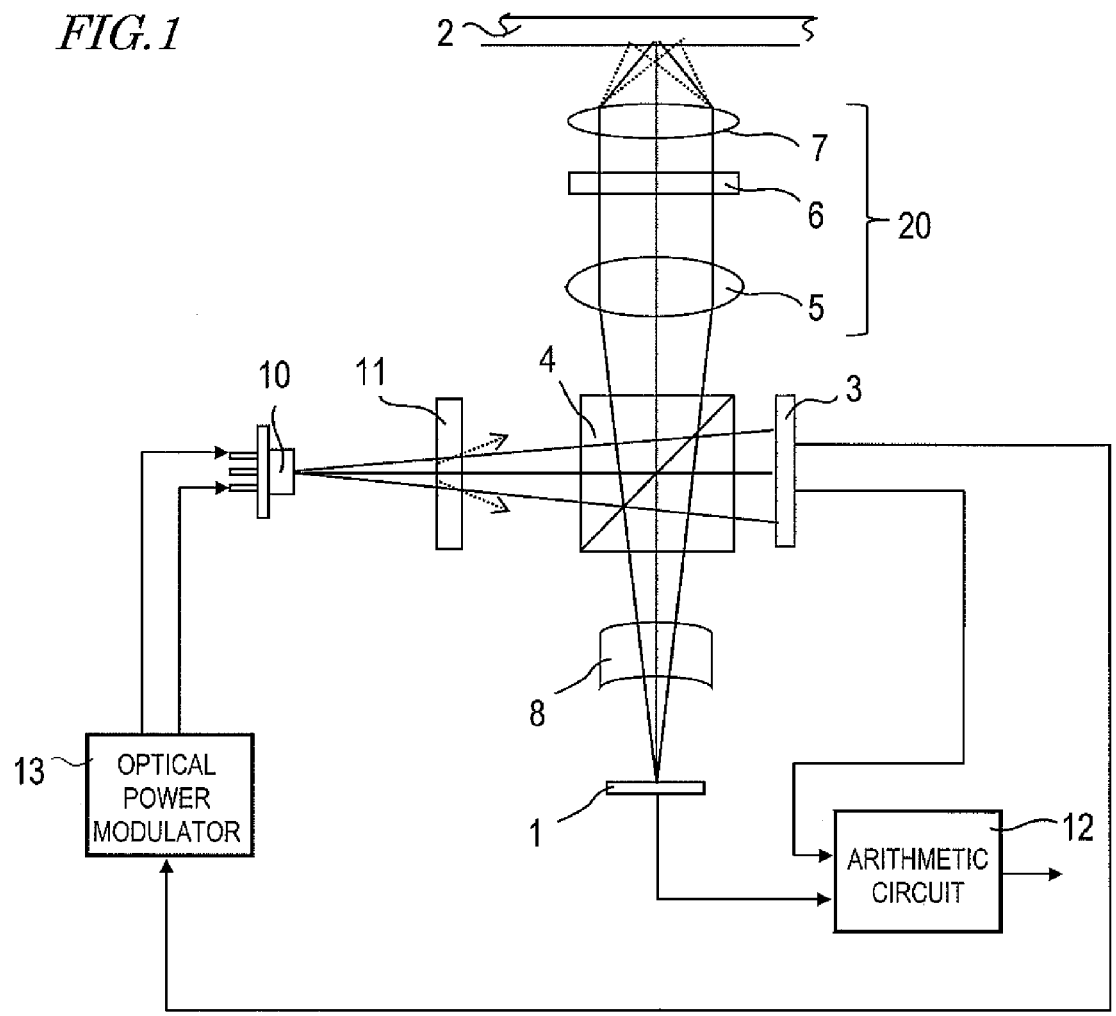
FIG. 1 illustrates an exemplary arrangement for an optical pickup as an embodiment of the present disclosure.

FIG. 1 illustrates an exemplary arrangement of an optical pickup as the first embodiment.

An optical pickup according to this embodiment includes: a laser light source 10 which emits light; an optical power modulator 13 which modulates the optical power of the laser light source 10; an optical element (e.g., a diffractive element 11) which splits the light that has been emitted from the laser light source 10 into a main light beam for writing and at least two sub-light beams including first and second sub-light beams; and an optical system 20 which condenses the main light beam and the first and second sub-light beams onto the same track on an optical storage medium 2, thereby forming a main spot and first and second sub-spots on the same track. The optical system 20 includes a collimator lens 5, a wave plate 6 and an objective lens 7, which are arranged in this order so that the collimator lens 5 is closer to the laser light source 10 than any other member of the optical system 20. The objective lens 7 is supported by a lens actuator (not shown) and the position of the objective lens 7 with respect to the optical storage medium 2 is adjusted by the lens actuator.

The optical pickup of this embodiment further includes: a first photodetector 1 which includes first, second and third photosensitive elements that are arranged to respectively receive the main light beam and first and second sub-light beams that have been reflected from the optical storage medium 2; a second photodetector 3 which includes fourth and fifth photosensitive elements that are arranged to receive the rest of the light that has been emitted from the laser light source 10 but that has not been reflected from the optical storage medium 2; and an arithmetic circuit 12. The configuration and operation of the first through fifth photosensitive elements will be described later. The arithmetic circuit 12 reproduces a signal that has been written on the optical storage medium 2 with the main light beam for writing by performing an arithmetic operation on the signal output of the second or third photosensitive element of the first photodetector 1 and the signal output of the fourth photosensitive element of the second photodetector 3.

This optical pickup further includes a polarization beam splitter 4 which is arranged to lead most of the light that has been emitted from the laser light source 10 (i.e., polarized light that is polarized in a particular direction) to the optical storage medium 2. This polarization beam splitter 4 has the function of reflecting most of the polarized light that has been emitted from the laser light source 10 but transmitting another part of the light that is polarized perpendicularly to the polarization direction of that polarized light. The light that has been reflected from the optical storage medium 2 is eventually transmitted through the polarization beam splitter 4 and led to the first photodetector 1. A detector lens 8 is arranged between the beam splitter 4 and the first photodetector 1.

1-2. Overall Operation

Hereinafter, it will be described how an optical pickup with such a configuration operates.

The light emitted from the laser light source 10 gets diffracted and split by the diffractive element 11 into a zero-order light beam and ±first-order light beams. In this case, the diffraction efficiency ratio of the zero-order light beam to the ±first-order light beams by the diffractive element may fall within the range of 10:1 to 20:1, for example. In this embodiment, the diffraction efficiency ratio of the zero-order light beam to the ±first-order light beams is set to be 15:1.

Part (e.g., 10%) of those split light beams is transmitted through the polarization beam splitter 4, while the rest (e.g., 90%) of them is turned into circularly polarized light beams through the collimator lens 5 and the wave plate 6 and then is condensed by the objective lens 7, thereby forming condensed light beam spots on the storage layer of the optical storage medium 2. The wave plate 6 is typically a quarter wave plate.

In the following description, the zero-order light beam and a condensed light beam spot formed by the zero-order light beam will be referred to herein as a "main beam" and a "main spot", respectively, while the ±first-order light beams and condensed light beam spots formed by the ±first-order light beams will be referred to herein as "sub-beams" and "sub-spots", respectively.

The light that has been reflected from the optical storage medium 2 is transmitted through the objective lens 7 and the wave plate 6 and transformed into plane polarized light, of which the polarization direction is perpendicular to that of the plane polarized light on the way toward the optical storage medium 2. This plane polarized light is transmitted through the polarization beam splitter 4, given astigmatism by the detector lens 8, and then incident on the photosensitive elements (i.e., the first through third photosensitive elements described above) of the first photodetector 1. Meanwhile, a part of the light that has been emitted from the laser light source 10 and then transmitted through the polarization beam splitter 4 is incident on the photosensitive elements (i.e., the fourth and fifth photosensitive elements described above) of the second photodetector 3. That is to say, the first and second photodetectors 1 and 3 are arranged so that part of the light going to the optical storage medium 2 is incident on the second photodetector 3 and that the light returning from the optical storage medium 3 is incident on the first photodetector 1. The optical power modulator 13 shown in FIG. 1 is used to record a mark on the optical storage medium 2.

In FIG. 1, such light going to the optical storage medium 2 and light returning from the optical storage medium 2 are illustrated in the same mix, and therefore, it is difficult to see how the light is transmitted and reflected. Thus, it will be described in further detail with reference to FIGS. 2 through 5 how the light is transmitted and reflected.

Figure 2:
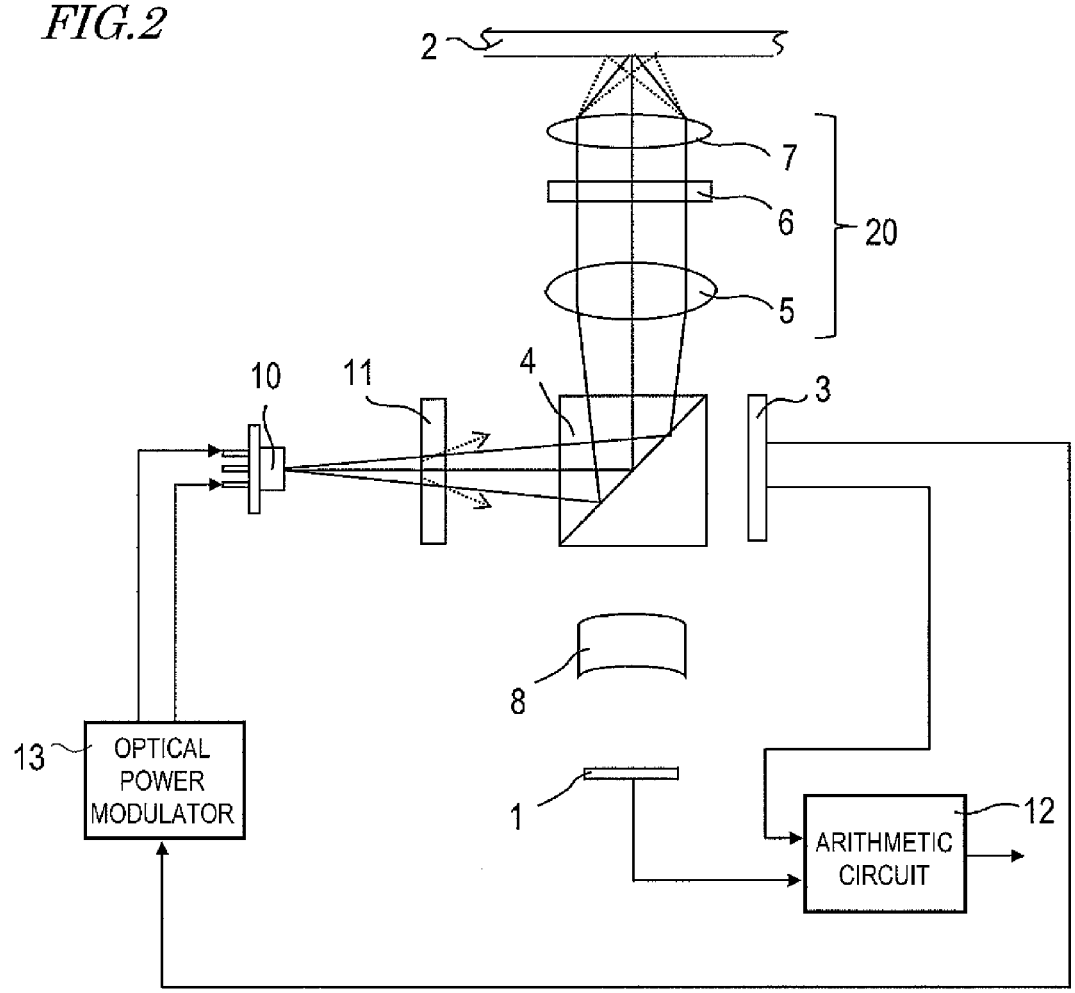
FIG. 2 illustrates how the light emitted from a laser light source 10 gets reflected from an internal reflective face of a polarization beam splitter 4, transmitted through an optical system 20 and incident on an optical storage medium 2.

First of all, look at FIG. 2, which illustrates how the light emitted (as an S wave) from the laser light source gets reflected from an internal reflective face of the polarization beam splitter 4, transmitted through the optical system 20 and incident on the optical storage medium 2.

Figure 3:
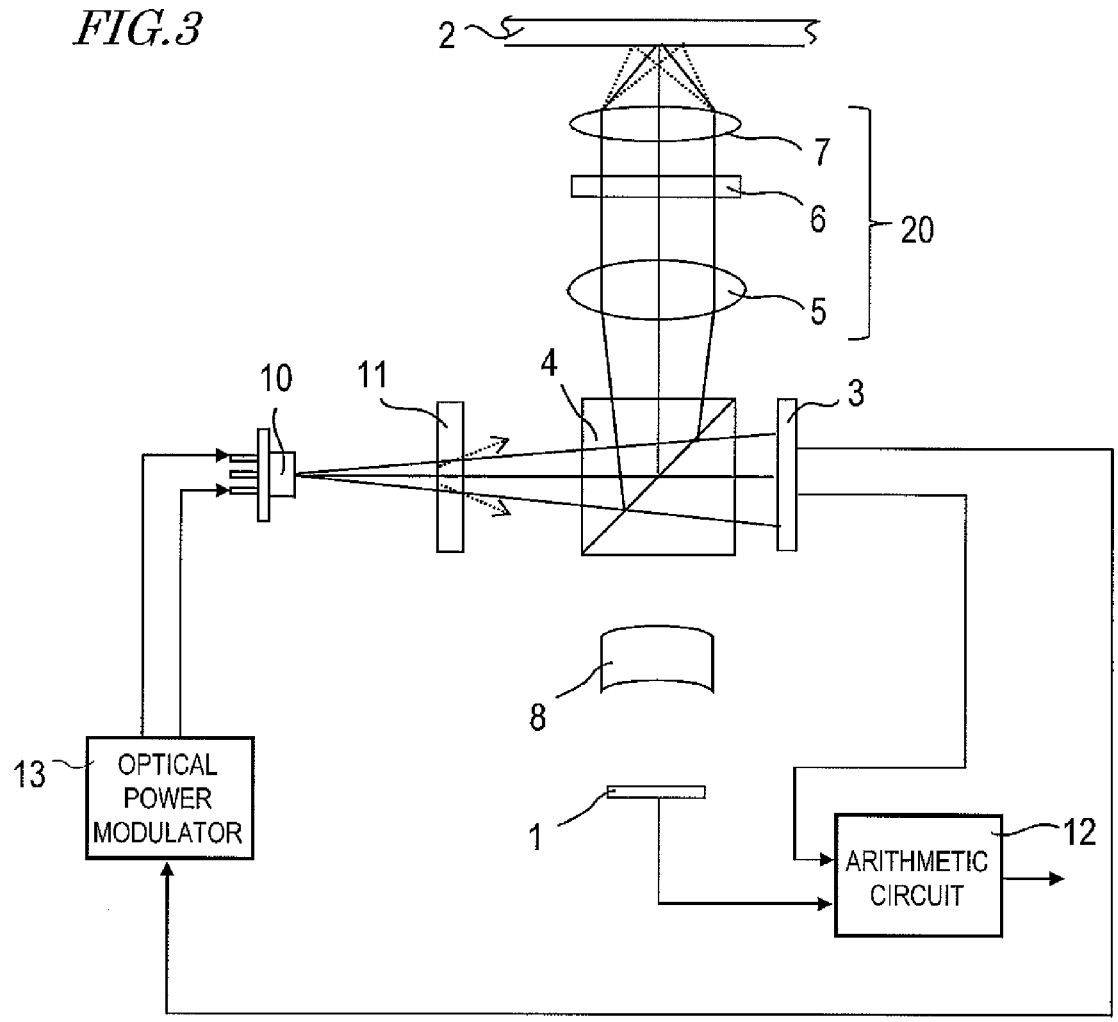
FIG. 3 illustrates how while most of the light emitted from the laser light source 10 gets reflected from an internal reflective face of the polarization beam splitter 4, transmitted through the optical system 20 and then incident on the optical storage medium 2, another part of the light gets transmitted through the polarization beam splitter 4 and incident on the second photodetector 3.

Next, look at FIG. 3, which illustrates how while most of the light emitted from the laser light source 10 gets reflected from an internal reflective face of the polarization beam splitter 4, transmitted through the optical system 20 and then incident on the optical storage medium 2, another part of the light emitted from the laser light source 10 gets transmitted through the polarization beam splitter 4 and incident on the second photodetector 3. The internal reflective face of the polarization beam splitter 4 is designed to reflect most of the totally plane polarized light (S-wave) that has been emitted from the laser light source 10 and transmit only a part of the light. The internal reflective face of the polarization beam splitter 4 is covered with a transflective film. And according to the design of that film, the transmittance and reflectance of the totally plane polarized light (S-wave) that has been emitted from the laser light source 10 can be adjusted. The transmittance of the polarization beam splitter with respect to the S-wave may be set to be within the range of 5% to 15%, for example.

Figure 4:
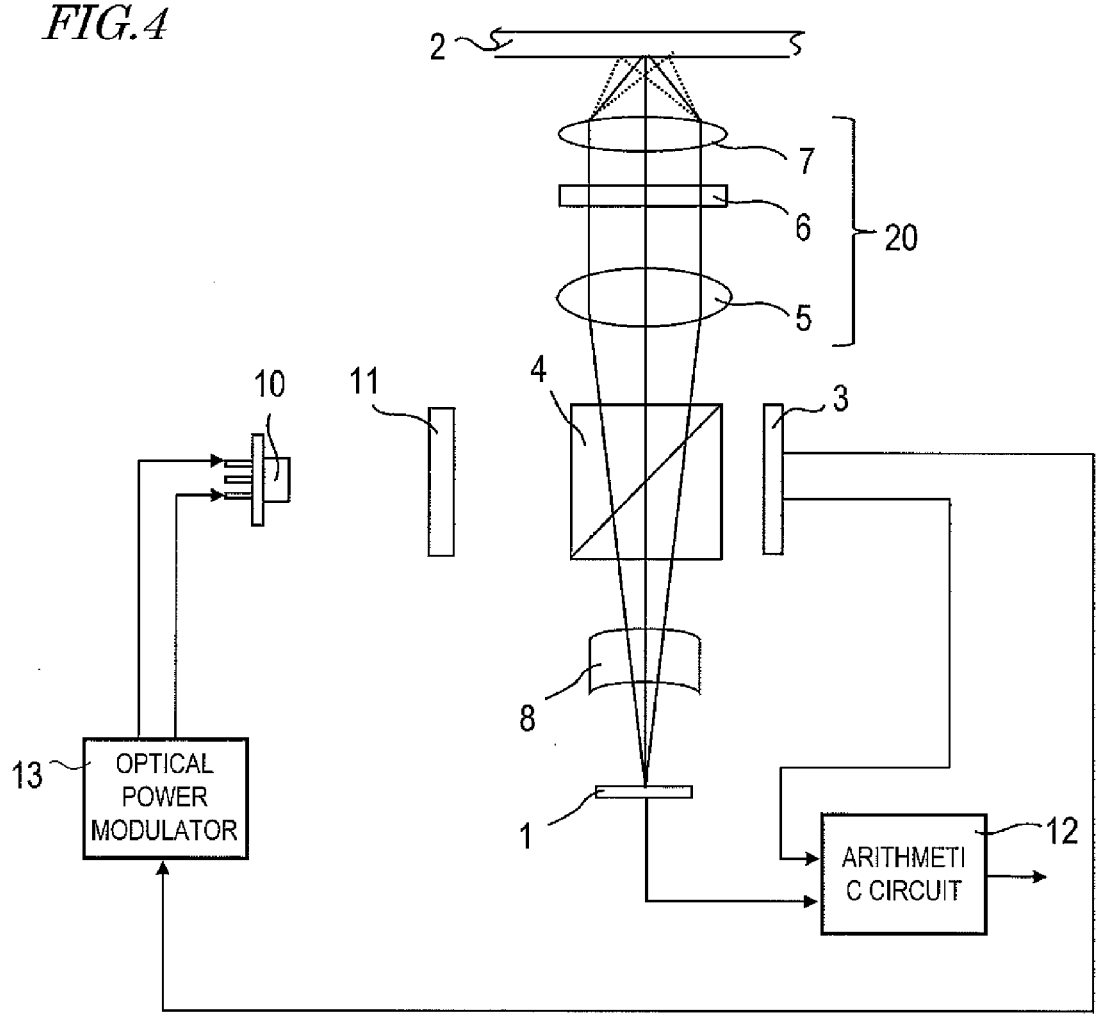
FIG. 4 illustrates how the light reflected from the optical storage medium 2 is transmitted through the polarization beam splitter 4 and incident on a first photodetector 1.

FIG. 4 illustrates how the light reflected from the optical storage medium 2 is transmitted through the internal reflective face of the polarization beam splitter 4 and incident on the first photodetector 1 for the sake of simplicity. When transmitted through the wave plate 6 of the optical system 20, the light that has been reflected from the optical storage medium 2 turns into plane polarized light (i.e., P-wave), of which the polarization direction has rotated 90 degrees with respect to that of the polarized light going to the optical storage medium 2. That is why the former light can be transmitted through the internal reflective face of the polarization beam splitter 4.

Figure 5:
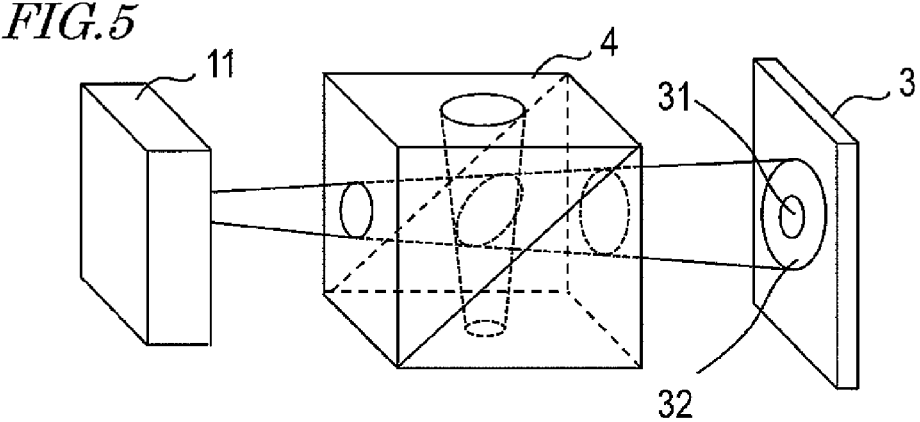
FIG. 5 is a perspective view schematically illustrating how the light that has entered the polarization beam splitter 4 gets reflected from its internal reflective face.

FIG. 5 is a perspective view schematically illustrating how the light that has entered the polarization beam splitter 4 gets reflected from its internal reflective face. As will be described in detail later, the second photodetector 3 on which part of the light going to the optical storage medium 2 is incident includes fourth and fifth photosensitive elements 31 and 32.

Figure 6:
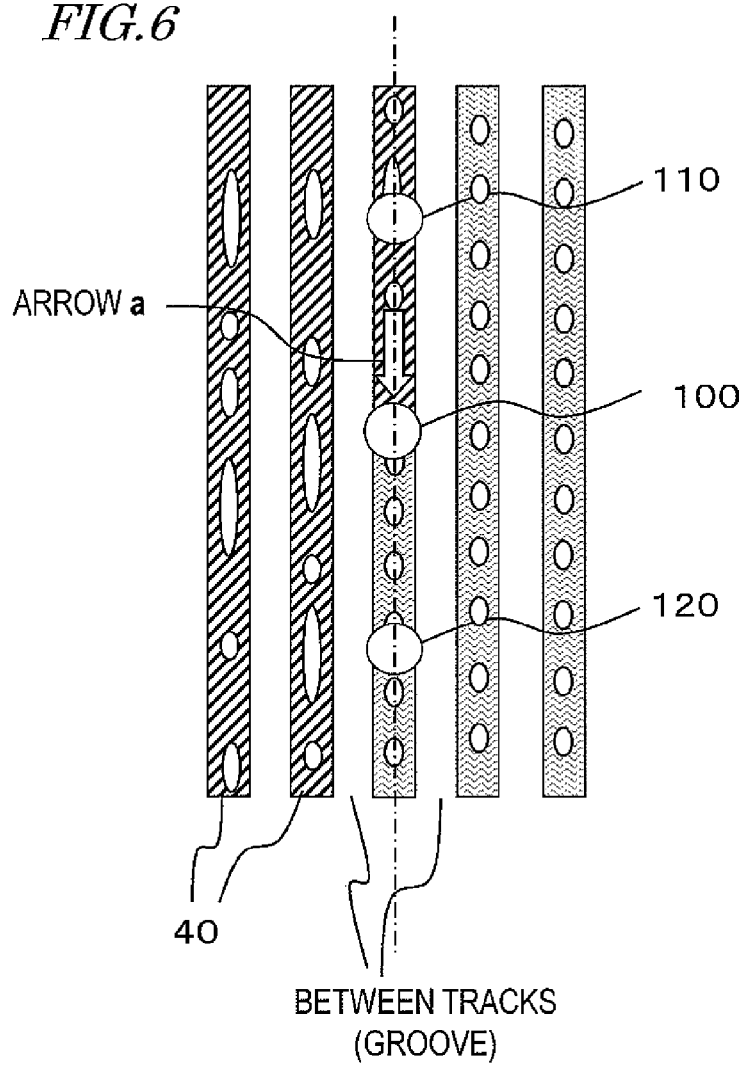
FIG. 6 illustrates how spots may be formed on an optical storage medium in an embodiment of the present disclosure.

FIG. 6 illustrates an exemplary arrangement of a main spot 100 and sub-spots 110 and 120 that are formed by condensed light beams on the storage layer of the optical storage medium 2. The storage layer of the optical storage medium 2 has unevenness, which is formed by land portions and groove portions that are arranged alternately. In this embodiment, marks are recorded on the tracks 40 (which will be referred to herein as "recording tracks") of land portions. The two recording tracks 40 of groove portions that are adjacent to the recording track 40 of each land portion contribute to generating a tracking signal. On the optical storage medium 2 of this embodiment, no marks are recorded on any groove portion. The optical read/write apparatus of the present disclosure may also handle an optical storage medium in which marks are recorded on the tracks of land portions and/or groove portions.

In this embodiment, the main spot 100 and the sub-spots 110 and 120 are formed on the same recording track (i.e., on a land portion or a raised portion of the unevenness) on which marks are going to be recorded. These spots 100, 110 and 120 appear to move on the optical storage medium 2 in the direction indicated by the arrow a. Actually, however, these spots 100, 110 and 120 are fixed and the optical storage medium 2 moves in the direction opposite to the one indicated by the arrow a. In the example illustrated in FIG. 6, marks have already been left on the recording tracks 40 on which marks are going to be recorded. That is to say, FIG. 6 illustrates how data is overwritten on the existent recorded marks.

Of these two sub-spots 110 and 120, the sub-spot 110 moves behind the main spot 100 to scan the mark that has just been recorded with the main spot 100. Meanwhile, the other sub-spot 120 moves ahead of the main spot 100, and its reflected light includes information about a mark that was recorded in the past. The light intensities of the main spot 100 and sub-spots 110 and 120 on the storage layer depend on the optical power modulator 13, the diffractive element 11 and the polarization beam splitter 4. In one example, if the light emitted from the light source has a power of 40 mW, the main spot 100 and sub-spots 110 and 120 on the storage layer may have light intensities of about 6 mW, about 0.4 mW and about 0.4 mW, respectively.

1-3. Configuration and Operation of Photodetectors

Figure 7:
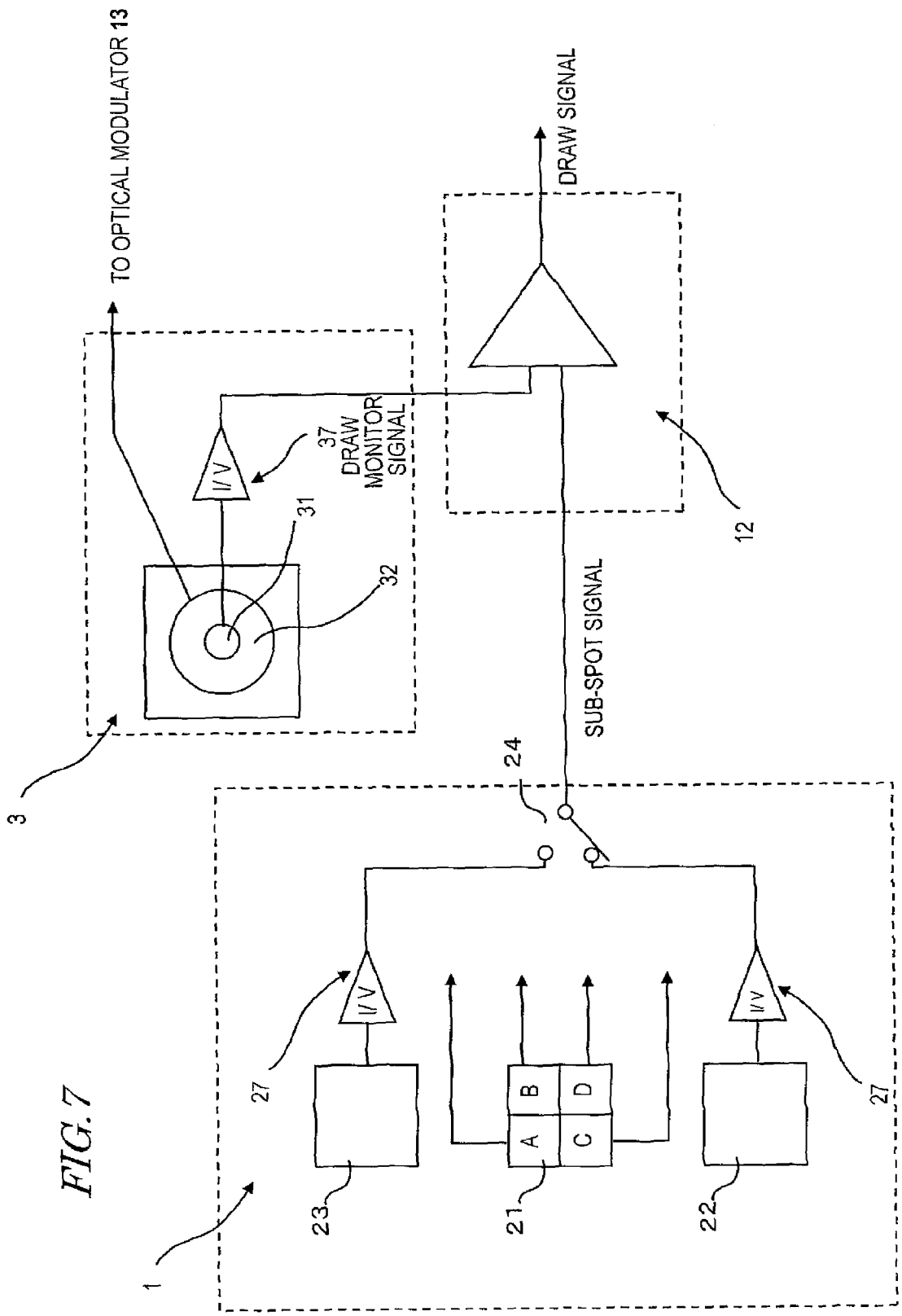
FIG. 7 illustrates an exemplary configuration for a signal detecting section according to an embodiment of the present disclosure.

FIG. 7 is a block diagram illustrating a configuration for the photosensitive elements of the first and second photodetectors 1 and 3 and an arithmetic circuit 12 which is connected to the photosensitive elements.

The main photosensitive element (which will be referred to herein as a "first photosensitive element") 21 of the first photodetector 1 receives a light beam that has left the main spot. The main photosensitive element 21 may be divided into four areas A through D, for example, which may be implemented as photoelectric transducers (such as photodiodes). The respective outputs of the areas A through D of the main photosensitive element 21 are connected to I/V amplifiers (not shown). As a result, the output signals of these areas A through D may be used as a focus error signal generated by the astigmatism method and as a tracking error signal generated by the push-pull method or the differential phase detection (DPD) method. The respective outputs of the areas A through D of the main photosensitive element 21 are also connected to an adder (SUM) (not shown). The adder adds together the respective output signals of the areas A through D, thereby generating a read signal. The tracking error signal and the focus error signal are generated by well known methods, which have nothing to do with the essence of the present invention, and description thereof will be omitted herein. The minimum permissible circle of confusion of the main spot on the main photosensitive element 21 may have a diameter of 70 μm considering the magnitude of the astigmatism produced by the detector lens, the zoom power and the adjustment accuracy and reliability of the optical pickup unit (OPU). The main photosensitive element 21 may have a size of 100 μm×100 μm, for example.

On the first photodetector 1, the sub-photosensitive element (which will be referred to herein as a "second photosensitive element") 22 receives reflected light that has left the sub-spot 110. On the other hand, the sub-photosensitive element (which will be referred to herein as a "third photosensitive element") 23 receives reflected light that has left the sub-spot 120. Their photosensitive areas may be larger than 60 μm×60 μm but smaller than 140 μm×140 μm. In this embodiment, the sub-photosensitive elements 22 and 23 each have an area of 100 μm×100 μm. These sub-photosensitive elements 22 and 23 are connected to a switch 24 via their associated I/V amplifiers 27. The switch 24 turns according to the running or rotating direction of the optical storage medium 2, thereby passing the sub-spot signal of one of the sub-photosensitive elements 22 and 23 to the arithmetic circuit 12. In the example illustrated in FIG. 7, the sub-photosensitive element 22 that receives the reflected light that has left the sub-spot 110 that moves after the main spot 100 is chosen and connected to the arithmetic circuit 12 on the next stage via the switch 24.

The second photodetector 3 includes a monitoring photosensitive element (which will be referred to herein as a "fourth photosensitive element") 31 and an APC (auto power control) photosensitive element (which will be referred to herein as a "fifth photosensitive element") 32. As shown in FIG. 5, the monitoring photosensitive element 31 and APC photosensitive element 32 on the second photodetector 32 receive a part of the light that has been emitted from the laser light source 10 and transmitted through the polarization beam splitter 4. In the example illustrated in FIGS. 5 and 7, the monitoring photosensitive element 31 and the APC photosensitive element 32 are arranged concentrically and the monitoring photosensitive element 31 is arranged inside of the APC photosensitive element 32. In this manner, the second photodetector 3 can have a simplified configuration. The light that has been incident on the photosensitive element 31 is transformed into a voltage signal by an I/V amplifier 37 and then supplied as a DRAW monitor signal to the arithmetic circuit 12. On the other hand, the light that has been incident on the photosensitive element 32 is supplied as an APC signal to control the output of the laser light source 10 to the optical power modulator 13. In this manner, the second photodetector 3 can monitor the power of the light that has been emitted from the laser light source 10 and generates a front monitor signal. The APC photosensitive element 32 may also be used in APC to control the optical power of the light emitted from the laser light source 10. The intensity of the light received by the APC photosensitive element 32 and the I/V amplifier connected to the APC photosensitive element 32 are optimized to perform the APC. The signal voltage and frequency response characteristic of the APC photosensitive element 32 usually disagree with those of the read sub-spot signal representing data that has been subjected to write modulation.

On the other hand, the intensity of the light received by the monitoring photosensitive element 31 and the I/V amplifier 37 may be set to fall within an appropriate range to perform an arithmetic operation on the read sub-spot signal representing data that has been subjected to write modulation. An I/V amplifier having the same configuration and performance as the I/V amplifiers 27 of the first photodetector 1 may be used as the I/V amplifier 37. The intensities of the light received by the second and third photosensitive elements may be set to be 0.8 to 1.2 times high as that of the light received by the fourth photosensitive element.

The arithmetic circuit 12 performs a differential operation on a sub-spot signal and a DRAW monitor signal. That is to say, by subtracting the DRAW monitor signal including a write modulation component from the sub-spot signal including the write modulation component that has been caused by the optical power modulator 13 in the sub-spot light and a signal component that has been produced by a mark recorded on a recording track, a DRAW signal (which is a signal component produced by the recorded mark) can be obtained.

In a write mode, in order to erase the mark that has already been recorded on the optical storage medium 2 and to newly record a mark on it, the laser light source 10 outputs erasing light that has been modulated with the data to be written. That is why the main beam and sub-beams that have been formed by getting the light emitted from the laser light source 100 split by the diffractive element 11 have already been modulated in a similar manner before striking the optical storage medium 2. When reflected from the optical storage medium 2, the sub-beam is modulated by the mark that has just been recorded on the optical storage medium 2 with the main beam. As a result, the reflected light of the sub-beam includes not only the optical modulation component for writing but also the signal component of a recorded mark that has just been written with the main beam.

At the top of FIG. 8, illustrated are two exemplary waveform components of the sub-spot signal. The exemplary waveform on the left-hand side is an example of the waveform of write-modulated sub-spot light and corresponds to the write modulation component that has been caused by the optical power modulator 13 in the sub-spot light. The "write Pw/15" on the axis of ordinates of this graph means that the power of the sub-spot light while a mark is being recorded is one-fifteenth of the write power, and the "erase Pw/15" means that the power of the sub-spot light while no mark is being recorded is one-fifteenth of the erase power. This is because in the diffractive element 11, the ratio of the diffraction efficiency of the main spot light to the sub-spot light is set to be 15:1 in this example. However, this diffraction efficiency ratio is just an example and may be changed into any other value, too.

On the other hand, the exemplary waveform shown on the right-hand side at the top of FIG. 8 is an exemplary waveform representing the reflectance of a portion being scanned with the write-modulated sub-spot light and corresponds to the signal component that has been produced by a mark recorded on a recording track. In FIG. 8, "2T", "4T" and other signs represent the lengths (i.e., the code lengths) of the recorded marks and "T" represents a clock period that is used as a reference for modulation. In the example illustrated in FIG. 8, the reflectance of a portion with a recorded mark (i.e., a recorded portion) is lower than that of an unrecorded portion. However, this is just an example of this embodiment.

In the example illustrated in FIG. 8, a DRAW signal can be obtained by subtracting a DRAW monitor signal from a sub-spot signal which is formed by superposing the two waveforms at the top one upon the other.

After the gains of the I/V amplifiers 27 and 37 have been adjusted so that the write modulation component of the sub-spot signal corresponds to that of the monitor signal, a differential operation is performed by the differential amplifier 12 on the sub-spot signal and the monitor signal. In this manner, a recorded mark signal (i.e., a DRAW signal) can be obtained.

Now the light intensities represented by the sub-spot signal and the monitor signal will be described.

As described above, the intensities of light of the sub-spots 110 and 120 on the storage layer are both 0.4 mW. On the other hand, after a recorded mark has been formed, the optical storage medium has a reflectance of 10%, for example. Supposing the transmission efficiency is 90% after the sub-spot light has been reflected from the optical storage medium 2 and until that light reaches the photosensitive elements 22 and 23, the light intensity of the sub-spot light on the sub-photosensitive elements 22 and 23 is 0.036 mW.

In the meantime, 10% of the light that has been emitted from the laser light source 10 is transmitted through the polarization beam splitter 4 and incident on the second photodetector 3. In this case, if the size of the APC photosensitive element 32 is determined so that the angle of incidence of the light that has come from the laser light source 10 and has impinged on the APC photosensitive element 32 on the second photodetector 3 becomes approximately a half as large as that of the light that has been incident on the collimator lens 5, 0.2 mW out of 40 mW of the light that has been emitted from the laser light source 10 can be received by the APC photosensitive element 32 and the monitoring photosensitive element 31. In such a situation, if the ratio of the radius of the APC photosensitive element 32 to that of the monitoring photosensitive element 31 is supposed to be 2.4 to 1, for example, the light incident on the monitoring photosensitive element 31 has an intensity of approximately 0.036 mW. Furthermore, if the monitoring photosensitive element 31 has a diameter of 100 μm in this case, then a photosensitive element having substantially the same frequency characteristic as the sub-photosensitive elements 22 and 23 can be obtained.

Figure 9A:
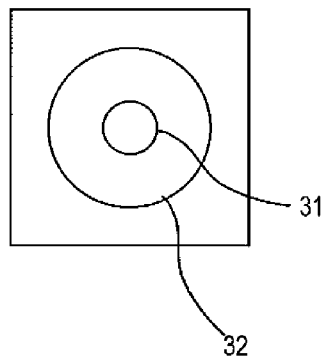
FIGS. 9A through 9C illustrate exemplary configurations for a monitoring photosensitive element (fourth photosensitive element) 31 and an APC photosensitive element (fifth photosensitive element) 32 in a second photodetector 3.
Figure 9B:
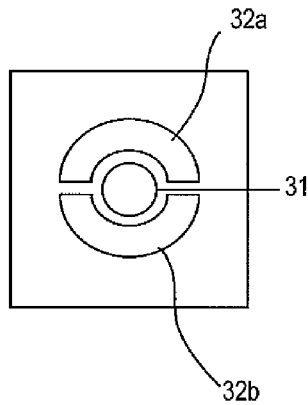
Figure 9C:
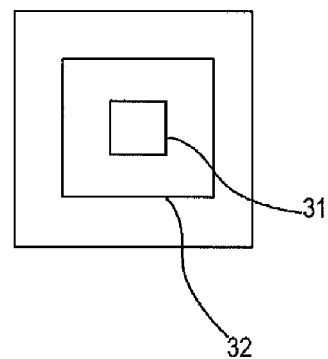

As shown in FIGS. 9A to 9C, the monitoring photosensitive element (fourth photosensitive element) 31 and APC photosensitive element (fifth photosensitive element) 32 on the second photodetector 3 may have various other configurations. For example, as shown in FIG. 9B, the fifth photosensitive element 32 may be split into two portions 32a and 32b. Also, the monitoring photosensitive element (fourth photosensitive element) 31 and/or the APC photosensitive element (fifth photosensitive element) 32 do not have to have a circular or ring shape but may also have a quadrangle or any other polygonal shape as shown in FIG. 9C.

1-4. Effects

In an optical pickup according to this embodiment, the signal obtained from the second or third photosensitive element 22 or 23 includes a recorded mark component and a component representing a light intensity variation caused by modulating the light emitted from the light source 10, while the signal obtained from the fourth photosensitive element 31 consists mostly of the component representing the light intensity variation caused by modulating the light emitted from the light source 10. That is why by subtracting the latter signal from the former signal, the recorded mark component, i.e., a DRAW signal, can be obtained. Even if data is overwritten on the optical storage medium 2 on which data has already been written, the same signal components are obtained by the second or third photosensitive element 22 or 23 and by the fourth photosensitive element 31, and therefore, a DRAW operation can be carried out.

According to this embodiment, the second, third and fourth photosensitive elements 22, 23 and 31 have substantially the same configuration, and therefore, there will be little difference in delay or distortion between the output signal of the second or third photosensitive element 22 or 23 and that of the fourth photosensitive element 31. As a result, a DRAW signal of quality can be generated by performing a simple differential operation between those two signals.

Also, even if the direction in which the optical storage medium 2 runs or rotates has changed, the signal obtained from the second photosensitive element 22 and the signal obtained from the third photosensitive element 23 are switched according to the traveling direction. Consequently, a DRAW operation can also be carried out by performing a differential operation between the signal obtained from the fourth photosensitive element 31 and the signal obtained from the second or third photosensitive element 22 or 23.

By arranging the fourth and fifth photosensitive elements 31 and 32 on the second photodetector 3, a DRAW monitor signal and an optical modulation APC signal can be obtained. Also, as the intensity of the light received by the second and third photosensitive elements 22 and 23 substantially agrees with that of the light received by the fourth photosensitive element 31, the differential circuit can be configured easily and a good DRAW signal can be obtained.

If the fourth photosensitive element 31 has a smaller size than the fifth photosensitive element 32, a DRAW monitor signal and an optical modulation APC signal can be obtained.

Also, if the second and third photosensitive elements 22 and 23 have a size of 60 μm to 140 μm, the best sub-spot signal to generate a DRAW signal can be obtained. In addition, the optical pickup can have its configuration simplified and can be assembled easily.

Furthermore, since the optical element for use to split the incoming light in the embodiment described above is a diffraction grating, the optical pickup can have its configuration simplified and can be assembled easily. Also, if the diffraction efficiency ratio by the diffractive element is set to be within the range of 10:1 to 20:1, the best sub-spot signal to generate a DRAW signal can be obtained.

On top of that, since the first and second photodetectors 1 and 3 are separated from each other, the fourth and fifth photosensitive elements 31 and 32 may be aligned with each other less exactly. As a result, the optical pickup can have its configuration simplified and can be assembled easily.

Although an embodiment of an optical pickup have been disclosed herein as an example of our device, the foregoing disclosure may be modified in numerous ways and may assume many embodiments other than the one specifically described above. Thus, the present disclosure is intended to cover all of those modifications as long as they fall within the true spirit and scope of the present disclosure.

Next, an exemplary circuit configuration for an optical read/write apparatus according to this embodiment will be described with reference to FIG. 10.

This optical read/write apparatus includes an optical pickup 100 having the same configuration as the optical pickup described above, a motor 107 that drives the optical storage medium 2, and a control section that controls the optical pickup 100. The control section includes a servo control section 1310, a frontend signal processing section 1306, an encoder/decoder 1308 and a CPU 1309.

Figure 10:
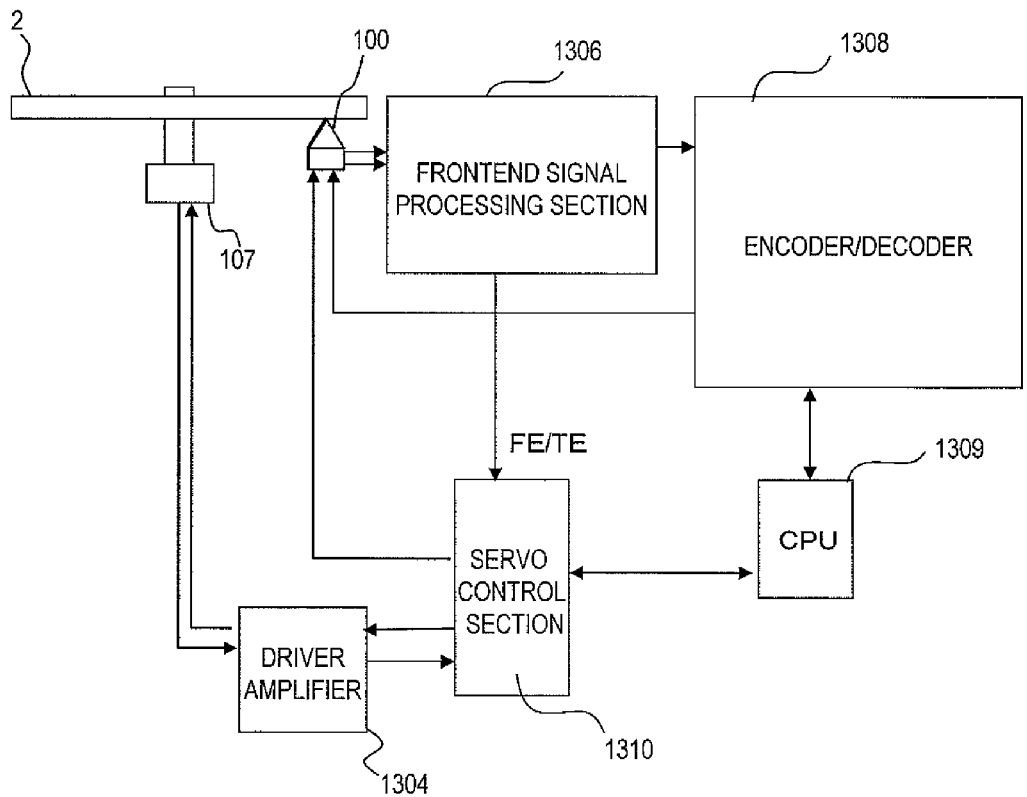
FIG. 10 is a block diagram illustrating an exemplary circuit configuration for an optical read/write apparatus.

In the exemplary configuration shown in FIG. 10, the output of the optical pickup 100 is supplied to the encoder/decoder 1308 by way of the frontend signal processing section 1306. In the read mode, the encoder/decoder 1308 decodes the data that is stored on the optical storage medium 2 based on the signal that has been generated by the optical pickup 100. In the write mode, on the other hand, the encoder/decoder 1308 encodes the data to generate a signal to be written on the optical storage medium 2 and outputs the signal to the optical pickup 100.

The frontend signal processing section 1306 generates a read signal based on the output of the optical pickup 100, and also generates a focus error signal FE and a tracking error signal TE. The focus error signal FE and the tracking error signal TE are then supplied to the servo control section 1310. In response, the servo control section 1310 gets the motor 107 controlled by a driver amplifier 1304. The servo control section 1310 also gets the position of an objective lens controlled by a lens actuator in the optical pickup 100. The encoder/decoder 1308, the servo control section 1310 and all the other components are controlled by the CPU 1309.

Other Embodiments

Although an embodiment of an optical pickup has been described herein as just an example of the present disclosure, various modifications, replacements, additions or omissions can be readily made on that embodiment as needed and the present disclosure is intended to cover all of those variations. Also, a new embodiment can also be created by combining respective elements that have been described for that embodiment disclosed herein.

Thus, some of those modified embodiments will be described below as other embodiments.

The optical storage medium does not have to be an optical tape but may also be an optical disc. The light source may include a plurality of semiconductor laser diodes that emit multiple light beams with mutually different wavelengths.

Also, although a diffraction grating is supposed to be used in the embodiment described above as an optical element for splitting the light emitted from the light source into a main light beam for writing and sub-light beams, a hologram may also be used as an alternative optical element. Furthermore, the optical system that forms a main spot and first and second sub-spots on the same track on the optical storage medium may also include a lens that is not shown in FIG. 1 or an optical element to correct aberrations.

The arithmetic section which reads the signal that has been written on the optical storage medium with the main light beam for writing by performing an arithmetic operation on the signal output of the second or third photosensitive element 22 or 23 and the signal output of the fourth photosensitive element 31 does not have to be built in as the arithmetic circuit 12 in the optical pickup. But the function of the arithmetic section may also be carried out by the signal processing section of the optical read/write apparatus. Likewise, the optical power modulator 13 does not have to be built in the optical pickup, either, but its function may also be carried out by the signal processing section of the optical read/write apparatus.

Furthermore, in the embodiment described above, the polarization beam splitter 4 is supposed to reflect the light that has been emitted from the light source 10 and to transmit the light that has been reflected from the optical storage medium 2. However, the optical pickup of the present disclosure does not have to have such a configuration. Alternatively, the optical pickup may also be configured so that the polarization beam splitter 4 transmits the light that has been emitted from the light source 10 and reflects the light that has been reflected from the optical storage medium 2.

Various embodiments of the present disclosure have been described by providing the accompanying drawings and a detailed description for that purpose. That is why the elements illustrated on those drawings and/or mentioned in the foregoing description include not only indispensable elements that need to be used to overcome the problems described above but also other inessential elements that do not have to be used to overcome those problems but are just mentioned or illustrated to describe the related art. Therefore, please do not make a superficial decision that those inessential additional elements are indispensable ones because they are illustrated or mentioned on the drawings or the description.

The present disclosure is applicable to an optical pickup and an optical read/write apparatus including the optical pickup. Specifically, the present disclosure can be used effectively to implement a read/write apparatus for a data file system that uses an optical tape or an optical disc.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2011-238367 filed Oct. 31, 2011 and No. 2012-169054 filed Jul. 31, 2012, the entire contents of which are hereby incorporated by reference.

What is claimed is:

1. An optical pickup comprising:
    a light source which emits light;
    an optical power modulator which modulates the optical power of the light source;
    an optical element which splits the light that is emitted from the light source into a main light beam for writing and at least two sub-light beams including first and second sub-light beams;
    an optical system which condenses the main light beam and the first and second sub-light beams onto the same track on an optical storage medium, thereby forming a main spot and first and second sub-spots on the same track;
    first, second and third photosensitive elements which are arranged so as to respectively receive the main light beam and first and second sub-light beams that have been reflected from the optical storage medium;
    fourth and fifth photosensitive elements which are arranged so as to receive the rest of the light that has also been emitted from the light source but has not been reflected from the optical storage medium; and
    an arithmetic section which reads a signal that has been written on the optical storage medium with the main light beam for writing by performing an arithmetic operation on the signal output of the second or third photosensitive element and the signal output of the fourth photosensitive element.

2. The optical pickup of claim 1, wherein the respective intensities of light received by the second and third photosensitive elements are set to be 0.8 to 1.2 times as large as that of light received by the fourth photosensitive element.

3. The optical pickup of claim 1, wherein the fifth photosensitive element is arranged around the fourth photosensitive element and the fourth photosensitive element has a smaller photosensitive area than the fifth photosensitive element.

4. The optical pickup of claim 1, wherein the fifth photosensitive element is connected to the optical power modulator and the power of the light emitted from the light source is controlled according to the output of the fifth photosensitive element.

5. The optical pickup of claim 1, wherein the optical element is a diffractive element.

6. The optical pickup of claim 5, wherein the ratio of the zero-order light diffraction efficiency of the diffractive element to the ±first-order light diffraction efficiency thereof is set to be within the range of 10 to 20.

7. The optical pickup of claim 1, comprising a first photodetector in which the first, second and third photosensitive elements are arranged and a second photodetector in which the fourth and fifth photosensitive elements are arranged.

8. The optical pickup of claim 7, comprising a polarization beam splitter which is arranged between the first and second photodetectors,
    wherein the polarization beam splitter is arranged so as to reflect the light that has been emitted from the light source and lead the reflected light to the optical storage medium and to transmit the light that has been reflected from the optical storage medium and lead the transmitted light to the first photodetector, and
    wherein the second photodetector is arranged so as to receive part of the light that has been emitted from the light source and then transmitted through the polarization beam splitter.

9. An optical read/write apparatus comprising:
    the optical pickup according to claim 1;
    a motor which drives the optical storage medium; and
    a control section which controls the optical pickup.

10. An optical read/write apparatus comprising an optical pickup, a motor which drives an optical storage medium, and a control section which controls the optical pickup, wherein the optical pickup comprises:

a light source which emits light;

an optical element which splits the light that has been emitted from the light source into a main light beam for writing and at least two sub-light beams including first and second sub-light beams;

an optical system which condenses the main light beam and the first and second sub-light beams onto the same track on the optical storage medium, thereby forming a main spot and first and second sub-spots on the same track;

first, second and third photosensitive elements which are arranged so as to respectively receive the main light beam and first and second sub-light beams that have been reflected from the optical storage medium; and fourth and fifth photosensitive elements which are arranged so as to receive the rest of the light that has also been emitted from the light source but has not been reflected from the optical storage medium, and wherein the control section includes:

an optical power modulator which modulates the optical power of the light source; and an arithmetic section which reads a signal that has been written on the optical storage medium with the main light beam for writing by performing an arithmetic operation on the signal output of the second or third photosensitive element and the signal output of the fourth photosensitive element.

* * * * *